March 6, 1956

R. E. MOORE ET AL 2,737,253

PROPELLER PITCH CONTROL

Filed March 13, 1952

INVENTORS
RICHARD E. MOORE
DALE W. MILLER
BY

*Willits, Hardman and Fahr*

ATTORNEYS

March 6, 1956
R. E. MOORE ET AL
2,737,253
PROPELLER PITCH CONTROL
Filed March 13, 1952
2 Sheets-Sheet 2
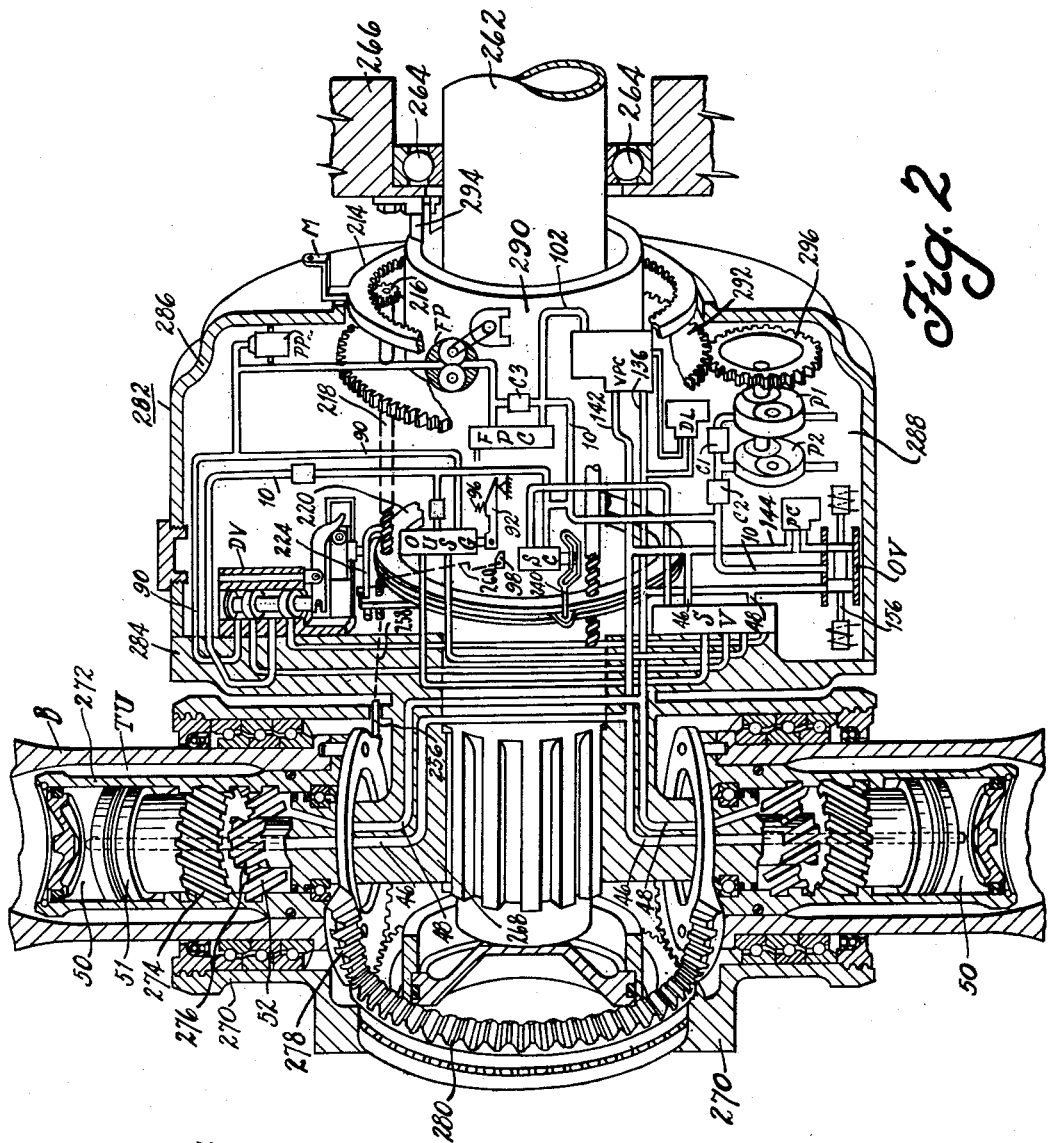
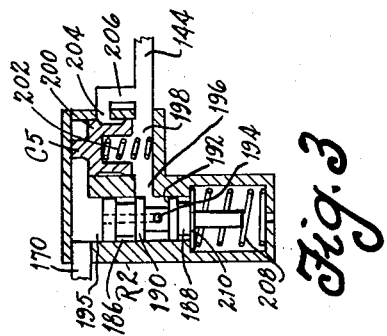
INVENTORS
RICHARD E. MOORE
DALE W. MILLER
BY
*Willits, Hardman and Feler*
ATTORNEYS

United States Patent Office 2,737,253
Patented Mar. 6, 1956

2,737,253
PROPELLER PITCH CONTROL

Richard E. Moore, Dayton, and Dale W. Miller, Brookville, Ohio, assignors to General Motors Corporation, Detroit, Mich., a corporation of Delaware Application March 13, 1952, Serial No. 276,372

15 Claims. (Cl. 170—160.21)

This invention relates to the control of aircraft propellers while they are rotating and particularly to those aircraft propellers that have tendencies while rotating to shift the blades in the sense of pitch angle toward one position of an adjustable pitch range.

One particular object of this invention is to provide control forces and apply them to the blades in such a manner that an opposing force will counteract the tendency to shift, and maintain the apparatus in an equilibrium condition, and yet have a sufficient reserve of power available for applying forces in assistance or in opposition to the blade tendencies to effect governor control operation of the propeller for correcting speed errors.

For accomplishing control of the blade pitch, a fluid pressure system is provided that supplies fluid flow in a volume that is sufficient to supply a double acting servomotor with flow under pressure to meet with the most drastic demands.

A variable pressure control valve assembly acts in the nature of a flow and pressure divider so as to fit the potential of the fluid reaching the servomotor to the power demands necessary for actuating the servomotor, whether the required force be small or large. Pitch control valves are afforded for distributing the controlled pressure to the servomotor in accordance with the signals received from a speed controlling device. An over-speed-under-speed governor valve connectible with the servomotor, defines the limits of the governing range. A precise governor valve connecting in parallel with the over-speed-under-speed governor valve applies the control forces to the servomotor in assisting and opposing relation to the blade twisting tendency. A selector valve is provided for determining the control of the servomotor as between a distributor valve and a governor valve assembly including the over-speed-under-speed governor and precise control valves. An electrically driven pump is manually controlled for supplying fluid under pressure for feathering and negative thrust operation in case the system pressure and flow is insufficient.

Further objects and advantages of the present invention will be apparent from the following description, reference being had to the accompanying drawings wherein a preferred embodiment of the present invention is clearly shown.

Fig. 1 is a fluid pressure circuit schematically illustrating the control of blade pitch according to the present invention.

Fig. 2 is a diagrammatical sectional view of an aircraft propeller mechanism embodying the instant invention.

Fig. 3 is an enlarged view in section illustrating the details of a valve assembly in the control circuit.

With particular reference to the drawings and first with respect to Fig. 1, system pumps P1 and P2 are driven upon rotation of the propeller and each feed thru a check valve C1 and C2, respectively, into a fluid pressure trunk line 10. The capacity of the pumps is sufficient to provide a continuous flow of considerable volume into and thru the trunk line 10 and its several branches to the torque unit TU, under the control of an over-speed-under-speed governor valve OUSG, a blade angle distributor valve DV, or an oscillatable valve OV. For this purpose the trunk line 10 is connected to a pressure supply port 12 in the over-speed-under-speed governor valve OUSG, a pressure supply port 14 in the distributor valve DV, a pressure supply port 16 of a selector control valve SC, and to a pressure supply port 18 of the oscillatable valve OV. The pressure trunk line 10 is also connected with a servo chamber 20 of a feather pump control valve FPC for controlling the admission of fluid pressure from motor driven feathering pump FP into the trunk line 10 thru check valve C3. So long as the pressure potential in chamber 20 exceeds some selected value, such as 500 p. s. i., a valve element 22 rises to connect the output of pump FP thru 24 and 26 to drain thru port 28. If the pressure in chamber 20 is less than 500 p. s. i., which occurs only at propeller speeds below the low limit of the controlled speed, valve 22 closes and the output from feathering pump FP passes thru check valve C3 into the trunk line 10.

The over-speed-under-speed governor valve OUSG has an increase pitch control port 30 and a decrease pitch control port 32 connected by passages 34 and 36 respectively to ports 38 and 40 of a selector valve SV, which has ports 42, 44 opening into control passages 46 and 48 connecting to opposed chambers 50 and 52 of a reversely operable fluid servomotor or torque unit TU.

The distributor valve DV has an increase pitch control port 54 and a decrease control port 56 connected by passages 58 and 60 respectively to ports 62 and 64 respectively of the selector valve SV.

When the selector valve SV is in the position illustrated in Fig. 1 the valve plunger 66 which has three lands 68, 70, and 72 is in the upward position so that ports 38 and 42 are connected, as well as ports 40 and 44, thus connecting the increase pitch port 30 of the over-speed-under-speed governor valve with the increase pitch chamber 50 of the servomotor TU. Likewise the decrease pitch port 32 of the over-speed-under-speed governor valve is connected to the decrease pitch chamber 52 of the servo motor. Control ports 54 and 56 of the distributor valve DV are blocked at the selector valve SV by lands 70 and 72 closing ports 62 and 64. In order to shift the selector valve SV to connect the control port of the distributor valve DV with the chambers 50 and 52 of the servomotor, the selector control valve SC is operated to connect the trunk line pressure at port 16 with passage 74 leading to a servo chamber 76 above the valve plunger 66 which causes the plunger to move downwardly blocking ports 38 and 40 from the under-speed-over-speed governor valve, and opening ports 62 and 64 to control passages 46 and 48 respectively. The selector valve SV and its control SC therefore determine whether the over-speed-under-speed governor valve or the distributor valve will control the operation of the blade servomotor TU. As will presently appear the distributor valve DV can be operated to take over control at any time and under any condition of propeller operation.

Control by the over-speed-under-speed governor OUSG determines a high speed limit and a low speed limit at which the propeller mechanism may be operated. The OUSG embodies a valve plunger 78 that has lands 80, 82, 84, and 86 of which lands 82 and 84 cooperate with control ports 30 and 32. The space between lands 80 and 82 is connected to space between lands 84 and 86, and is always open to the drain port 88 connected by drain passage 90 to the intake of the feather pump FP. Similar provisions in the distributor valve DV connect by passage 90a for the same purpose. The plunger 78 is articulated to a lever 92 one end of which rests on a fulcrum 94 under the urge of a spring 96. A stop 98 is engageable with the plunger 78 for variably limiting the operation of the valve at the low speed end of the governing range and a spring abutment 100 limits the movement at the high speed end of the range.

Throughout the governing range the lands 82, 84 normally block the ports 30, 32 and only open those ports as the propeller speed reaches the limits of the governing range. Actual governing is accomplished by the oscillatable valve OV and its associated mechanism under the control of signals received from the outside. However, any control port opening of the over-speed-under-speed governor valve OUSG or the distributor valve DV, when selected by the selector valve SV, distributes and directs the pressure and flow of the trunk line to one side or the other of the blade servomotor TU and opens the other side to drain. In the governing range of propeller operation, the oscillatable valve OV accomplishes the distribution of control forces without regard to the selector valve. The control of pressure potential and flow of fluid in the trunk line 10 is controlled at all times by a variable pressure control valve assembly VPC, consisting of a pressure relief valve PR, an equal area valve EA, and a shuttle valve S. That valve assembly reduces the fluid flow and pressure in the trunk line to what is needed or demanded in accomplishing a small control function, and immediately steps up the flow and pressure to accomplish a blade adjustment of greater magnitude made possible by means of fluid pressure feed back to the shuttle valve. Thus, the variable pressure control valve assembly is a pressure regulator and flow divider. In that dividing action the excess or surplus flow is diverted to drain.

A branch 102 connects the trunk line 10 with a chamber 104 of the pressure relief valve PR and extends by passage 106 to a chamber 108 of the equal-area valve EA. Chamber 104 is reduced in bore to provide a servo chamber 110 housing a piston 112 and a valving land 114 of a plunger 116 maintained under spring load 118. The chamber 108 is reduced in bore to provide a servo chamber 120 housing a valving land and piston 122 of a valve plunger 124 under the urge of a spring 126. The variable pressure control valve VPC is so mounted in the rotating propeller that centrifugal force acting upon the plungers 116 and 124 assists the springs 118 and 126 in closing drain ports 128 and 130 respectively, which are connected with a common drain passage 132. The pressure potential existing in the trunk line 10 is always supplied to the chambers 104 and 108 and is exerted against the upper face of valving land 114 and the upper face of valving land 122 in opposition to the centrifugal force, the pressure potential exerted against the lower faces of lands 112 and 122 from conduit 136, and to the force of springs 118 and 126 applied to both plungers. The upper ends of plungers 116 and 124 are formed with apertured flanges which serve as damping means for their respective plungers. As the flanges are apertured, the pressure potential of fluid in chambers 104 and 108 acts on both surfaces of these flanges and, accordingly, no resultant control is effected on the plungers. Manifestation of high pressure in either valve chamber 104 or 108 tends to force the valve plungers downwardly to open drain ports 128 and 130. The calibration of pressure relief PR is such as to limit in one instance the maximum pressure that may be attained in the trunk line 10 during a decrease pitch movement of the blades. This valve PR is provided with a fluid pressure feed-back from the increase pitch control line by means of passages 134 and 136. The equal-area valve EA is calibrated to open its drain port 130 at a pressure potential slightly higher than what is needed for effecting a control function in either control passage 46 or 48. It has a passage 138 connecting the servo chamber 120 with a bore 139 of a shuttle valve S which houses a shiftable element 140 for connecting either passage 136 or 142 with the servo chamber 120.

Passages 136 and 142 are feed-backs joining branches 144 and 146 extending between the oscillatable valve OV and control passages 46 and 48. By that connection the shiftable element 140 of the shuttle valve S will traverse the bore 139 and apply the pressure of branches 144 or 146, whichever is the higher, to the servo chamber 120 of the equal-area valve EA. However, movement of the element 140 has no effect upon the feed-back pressure applied thru 134 and 136 to the servo chamber 110 of the pressure relief PR. That servo chamber 110 is always subject to the pressure potential existent in the increase pitch line 46 through the passages 134 and 136.

All governing of the propeller operation is normally effected by the oscillatable valve OV which has control ports 148 and 150 controlled by lands 152 and 154 of a valve plunger 156. This valve plunger is movable to right and left between the stops 162 and 164 under the influence of magnet windings 158 and 160 energized by wires 166 and 168. Oscillation or control of the valve 156 is effected by alternate energization of the windings 158 and 160, to hold the plunger for equal periods of time alternately against stops 162 and 164 during an on-speed condition and differentially changing the period of dwell against the stops during an off-speed condition. One device for operating and establishing a differential dwell of the plunger 156 is accomplished by a controller of the type disclosed and claimed in application Ser. No. 94,984, now U. S. Patent No. 2,669,312. Due to the different widths of lands 152 and 154 and their cooperation with ports 148 and 150 movement of valve plunger 156 to the right will open port 148 to drain and will open port 150 to trunk line pressure at port 18. In that position passage 146 will be open to drain for chamber 52 of the torque unit TU and port 150 will be connected by passage 170, pressure compensating valve PC and passage 144 to control passage 46 and increase pitch chamber 50 of the torque unit TU. When the valve member 156 is shifted to the left, then port 148 is still closed and port 150 is open to drain so that the back pressure in the increased pitch chamber 50 is relieved thru passage 144 to pressure compensator PC and passage 170. When in this position control forces for application to the decrease pitch chamber 52 come from the decrease pitch loader valve assembly DL which is inserted between the drain passage 132 from the pressure control valve VPC, and a passage 172 connecting with the decrease pitch branch 146.

The decrease loader valve DL comprises a check valve C4 and a pressure relief valve R1. Surplus fluid and flow coming thru the drain passage 132 opens to the face 174 of the check valve C4 and is always communicated to a groove 176 of a pressure reducing valve which upon exposure to sufficient pressure moves downwardly against spring 178 to open an orifice 180. When the pressure in 132 is sufficient the plunger 182 of the check valve moves against spring 184 to uncover the opening to passage 172. So long as there is any fluid flow from the drain ports 128 and 130 of the pressure control valve VPC there will be fluid pressure against the face 174 of the check valve and in the groove 176 of the pressure relief. The check valve C4 admits a portion of the pressure and flow in the drain passage 132 to the decrease pitch chamber 52 of the servo motor TU. The remainder of the pressure and flow in the drain passage 132 is also admitted to the pressure relief element which directs it to the reservoir thru orifice 180. Thus, the decrease pitch chamber 52 of the servo motor is always loaded by the pressure and flow from the variable pressure control valve unless the control port 148 of the valve OV is open to drain.

When that port is open to drain, port 150 is open to apply trunk line pressure to the increase pitch side 50 of the servomotor TU. The control force applied thru 170 opens to the pressure side of the check valve C5 and to the exhaust side of the pressure reducer valve R2 comprising the pressure compensator PC. The decrease loading valve DL and the pressure compensating valve PC operate upon the same principle as is described with reference to Fig. 3, where there is shown in large section a pressure compensating valve PC. This valve assembly provides a bore 186 that houses a plunger 188 having a valve land 190 spaced from a guide land 192 between which opens an axial passage 194 opening at the pressure side 195 of the land 190. A throttle port 196 opens from the bore 186 to a chamber 198 connected with the branch 144. Within the chamber 198 there is a check valve element 200 urged by a spring 202 to close a port 204 opening by branch 206 into the main branch 144. The face of the check valve element 200 is always open to the pressure in chamber 195 and passage 170. A spring 208 urges the plunger 188 to the stop position indicated by flange 210 under which condition the port 196 is open to fluid flow from branch 144. Pressure applied thru passage 170 acts on the element 200 of the check valve and depresses it against the spring 202 until port 204 is opened permitting substantially unrestricted flow to passage 170 thru 144. Fluid flow from passage 144 is restricted from passing in the opposite direction since the check valve will be seated and flow must pass thru 196 and 194 to 170, and with restrained flow by restricted opening of port 150 of the valve OV of Fig. 1, pressure will build up in the chamber 195. Pressure in chamber 195 will depress the valve element 188 against the spring 208 so that land 190 will throttle the flow of fluid through port 196. A constant pressure is thereby maintained in chamber 195 which maintains a constant flow of fluid from line 144 to line 170. Thus, the flow of fluid to the increase pitch chamber 50 from the control port of the oscillatable valve OV is substantially unrestricted, while the rate of flow from vent chamber through port of valve OV is controlled.

In the loader valve DL one pressure applied against the face 174 of the check valve C4 passes to the outlet side 172 without substantial diminution. Reverse flow from 172 is entirely cut off. If flow from 132 is not accompanied by flow or relief through 172 then all of the diverted drain in 132 passes to the groove 176 of the relief R1, and then through the axial bore to the end face of the plunger depressing it against the spring 178 to open the port 180.

Due to the coaction of the loader valve DL, and the compensating valve PC the oscillatable valve OV is operable under control of the outside controller to maintain the servo unit TU in an equilibrium condition in which the blade B is held at a satisfactory angle. Under those conditions the valve 156 is oscillating and held against stops 162 and 164 alternately for equal periods of time. Though aerodynamic and centrifugal forces acting upon the blade B tend to twist the blade toward a predetermined angular setting, for instance a predetermined low pitch angle, the aggregate of forces applied to opposite sides of the piston 51 just balance, and there is no resultant movement of the blade. Under those conditions the control force applied to the decrease pitch chamber 52 plus the aerodynamic and centrifugal forces just balances or opposes the control force applied to the increase pitch chamber 50. During governing by the oscillatable valve OV the control forces will be applied thru branches 144 and 146 with the assistance of the loading valve DL and the compensating valve PC. Due to the high rate of oscillation of the valve, control forces of very small magnitude will be alternately applied to the opposite sides of the servo motor TU. If the propeller mechanism is operating on-speed the aggregate of those opposing forces are equal with no resultant movement of the blade, so long as the valve 156 dwells an equal extent of time against the stops 162 and 164. The alternation of control forces in branches 144 and 146 can be best understood by considering the plunger 156 of the valve OV held in one position or the other.

When the plunger 156 is moved to increase pitch position port 150 is connected with port 18 and port 148 is open to drain. Trunk line pressure from 10 then passes thru 170 to the bore 186 of reducer R2 and to the face of check valve C5. The check valve element 200 is depressed so that the trunk line pressure from 170 passes thru branches 206, 144 and 46 to the increase pitch chamber 50 of the servomotor TU. Thus, the control pressure in trunk line 10 is applied without substantial diminution to the increase pitch chamber of the torque unit. The opposing decrease pitch chamber 52 drains freely thru control passage 48, branch 146 and port 148. Therefor, the movement of piston 51 in the increase pitch direction is resisted only by the aerodynamic and centrifugal twisting moments applied to the blade. The trunk line pressure applied to branch 144 feeds back to the pressure relief valve PR and equal area valve EA by passage 136 and shuttle valve S. That feed-back increases the resistance to blow-off at the drain ports 128 and 130 and therefore cuts down the drain through passage 132 to the loader valve DL. Thus, the pressure in trunk line 10 is immediately increased to provide the power needed or demanded in making the increase pitch shift.

When the plunger 156 is moved to the left, the decrease pitch position, port 150 is opened to drain but the port 148 remains closed, and there is no flow of pressure from trunk line 10. The surplus of fluid in passage 132 from the variable pressure control valve is applied against the face 174 to depress check valve C4 and then to passage 172, passage 146 and control passage 48 to the decrease pitch chamber 52 of the servomotor TU. The fluid pressure applied to chamber 52 is assisted by the aerodynamic and centrifugal forces on the blade B, and if greater than the forces applied in chamber 50 will effect a movement of the piston 51 in the decrease pitch direction. The fluid pressure forces in chamber 50 have been reduced due to the opening of port 150 to drain. Drain back from the increase pitch chamber 50 thru control passage 46 and branch 144 passes behind check valve 200 through port 196 and thru the axial passage 194 of the reducer R2. From there the drain fluid passes thru 170 to the drain port 150 which is restricted in order to control the drain back. The pressure head, established in the passage 170 and in the bore 186, restricts the flow as previously described in connection with Fig. 3.

Thus, while a decreasing pitch change is being made the pressure is reduced and the flow is divided off from the trunk line 10, and at least a portion of that divided flow is applied to the decrease pitch chamber 52 with the remainder escaping thru 180 to the reservoir. Any drain back from chamber 50 is restricted by the reducer valve R2 and the restricted drain opening at 150.

While an increase in pitch change is being made substantially the full effect of pressure and flow in trunk line 10 is applied to the increase pitch chamber 50 with the drain from chamber 52 thru 146 and 148 being unrestricted.

During governing, and under on-speed conditions where there is no resulting shift of the blades, and with the oscillatable valve having equal alternate dwells against the stops 162, 164, minute pitch change forces are alternately applied to opposite sides of the blade servomotor. Thus a dynamic condition of the fluid pressure system is maintained at which trunk line pressure will be applied to the increase pitch side of the servomotor TU, which is balanced on the decrease pitch side by the aerodynamic and centrifugal twisting forces plus a portion of the divided flow and reduced pressure from the variable pressure control valve VPC.

For other than governed operations of the propeller the manual lever M is actuated by the pilot. The lever M in the form of a circular rack 214 rotates a pinion 216 which by a screw or other linkage 218 shifts a control ring 220 within the propeller mechanism. A shoe 222 riding in the control ring 220 swings one end of a floating lever 224 within a yoke 226, to shift a cam lever 228 pivoted at 230 and articulated at 232 to a valve plunger 234 of the distributor valve DV. The distributor valve plunger 234 has lands 236 and 238 cooperable with control ports 54 and 56. The control ring 220 has linkage 240 connected with a block 242 having a cam slot 244 for shifting a spool valve 246 of the selector control valve SC, that spool having lands 248 and 250 controlling the flow of trunk line pressure from 16 to the passage 74. Thus, by movement of the manual lever M the distributor valve DV is manually controlled for directing fluid flow from trunk line 10 to either control ports 54 or 56, and the selector valve SV is actuated so as to connect the distributor valve DV with a servomotor TU in place of the over-speed-under-speed governor valve OUSG. Other linkage not shown coincidentally cuts off the control of the oscillatable valve OV by interrupting the control leads 166 and 168 so that the valve plunger 156 comes to rest in a central position where ports 148 and 150 are both closed.

If the manual lever M is moved in one direction the distributor valve DV will be actuated to call for an increase pitch adjustment and perhaps will call for a feathering operation. If the manual member M is operated in the opposite direction the valve will be moved to a decrease pitch adjustment and perhaps negative thrust operation. In any case movement of the piston 51 of the servomotor TU thru its linkage 252 and 253 actuates the blade B to change its angular setting. Whatever movement takes place blade B operates a feed-back mechanism 254 and 256 to adjust a screw or other element 258 in resetting the yoke member 226 which allows the valve plunger 234 to reassume its governing relation with respect to the control ports 54 and 56. An extension 260 of blade feed-back mechanism 256 actuates the movable stop 98 to such an extent that when the negative pitch position is reached the valve plunger 78 will be forcibly moved upward. With the plunger in the upward position, the ports and lands of the OUSG will be such that connections will be proper to direct the fluid pressure to the increase pitch chamber of the servomotor TU when the manual lever M calls for the return from negative to positive pitch.

With reference to Fig. 2, a propeller shaft 262 rotatable in bearings 264 supported by gear casing 266 mounts a propeller hub 268 that has sockets 270 within which are journalled blades B under control of servomotors TU. The servomotor provides a cylinder 272 within which is movable the piston 51 dividing the cylinder into increase pitch chamber 50 and decrease pitch chamber 52. Due to helical splines 274 and 276, lineal movement of the piston 51 rotates the blade B within its socket 270 and a blade gear 278 of each blade meshes with a master gear 280. The piston of the servomotor TU is moved by the fluid pressure applied and relieved thru passages 46 and 48 which are connected into the fluid circuit or hydraulic organization schematically shown in Fig. 1. That fluid circuit is housed within a regulator 282 comprising a regulator plate 284 and a cover 286 forming a reservoir 288. This reservoir 288 houses the pressure developing means and fluid distribution means making up the controller of the propeller mechanism. Regulator 282 is rotatable about an adapter sleeve 290 providing a pump drive gear 292 held in a stationary position within the reservoir by means of lug and notch engagement 294 provided by the member 266. The pump driving gear 292 rotatably supports the linkage 218 by means of which the control ring 220 is shifted thru operation of the manual lever M in adjusting the ring 214 to drive the pinion 216. The stationary gear 292 drives a pump pinion 296 that has driving relation for the system pumps P1 and P2 whenever the propeller mechanism is rotated about the adapter assembly 290.

While the embodiment of the present invention as herein disclosed, constitutes a preferred form, it is to be understood that other forms might be adopted.

What is claimed is as follows:

1. A control system for adjusting the pitch position of propeller blades mounted for rotation about their longitudinal axes and subject to external aerodynamic and centrifugal twisting moments which tend to rotate the blades toward a predetermined pitch position, and including a fluid pressure operated servomotor operatively connected to said blades for adjusting the pitch position thereof, comprising in combination, a high capacity fluid pressure source, a variable pressure control valve assembly operatively connected with said source and said servomotor and operable to control the pressure potential of said source in accordance with the pressure potential required by said servomotor in adjusting the pitch position of said blades, said variable pressure control valve assembly having connection with a conduit and being operable to divert any surplus fluid flow of said source to said conduit, control valves operatively connected with said source and said servomotor for applying controlled pressure fluid from said source to said servomotor so as to adjust the pitch position of said blades in opposition to the external forces, and valve means operatively connected with said surplus flow conduit and said servomotor for applying diverted surplus fluid flow from said conduit to said servomotor so as to adjust the pitch position of said blades in assistance with said external forces.

2. The combination set forth in claim 1 wherein, one of said control valves comprises an oscillatable valve with spaced ports connected with opposite sides of said servo, and oscillatable to one position for directing controlled pressure fluid to one side of the servo in opposition to the said twisting moments and for opening the other side of said servo to drain, said control valve being oscillatable to a second position for opening said one side of said servo to drain in assistance to said twisting moments, and a valve assembly in the connection to said one side of the servo for restricting the return flow of fluid from said one side of the servo to drain.

3. The combination set forth in claim 1 wherein, one of said control valves comprises an oscillatable valve with spaced ports connected with opposite sides of said servo, and oscillatable to one position for directing controlled pressure fluid to one side of said servo for opposing the said twisting moments and for connecting the other side of said servo to drain, said control valve being oscillatable to a second position for opening said one side of said servo to drain, and wherein said valve means comprises a valve assembly connected to said other side of said servo and open to the surplus fluid flow conduit and including a check valve for applying surplus fluid flow to said one side of said servo in assisting relation to said twisting moments, said valve assembly including a throttling valve for diverting to drain the remainder of said surplus fluid flow beyond what is needed for assisting the twisting moments.

4. The combination set forth in claim 1 wherein, one of said control valves comprises an over-speed-under-speed governor valve connected with the pressure source and operable to mark the high speed and low speed limits of a governing range, a pair of control ports in said over-speed-under-speed governor valve normally closed during propeller operation within the governing range, and connected with opposite sides of said servomotor, another of said control valves comprising an oscillatable valve having connections with opposite sides of said servomotor, and means for moving the oscillatable valve for control of fluid flow to and from said servomotor during pitch change movement within the governing range, and means including said over-speed-under-speed governor valve for supplementing the operation of said oscillatable valve in maintaining propeller operation within said speed limits.

5. The combination set forth in claim 1 wherein, one of said control valves comprises an oscillatable valve with spaced ports connected with opposite sides of said servo, a pressure compensating valve assembly embodied in the connection between one of said ports and one side of said servo for applying substantially unrestricted controlled pressure fluid to said servomotor in opposition to said twisting moments, and for restricting drain back from said one side of servomotor to said first mentioned port, and wherein said valve means comprises a loader valve assembly connecting said surplus fluid flow conduit with the connection to the other side of servomotor so as to apply surplus fluid flow in assisting relation to said twisting moment, and means for operating said valves for selectively controlling the opposition and assistance to said twisting moments.

6. The combination set forth in claim 1 wherein, one of said control valves comprises an oscillatable valve with spaced ports connected with opposite sides of said servo, and wherein said valve means comprises a loader valve assembly connected to said surplus flow conduit and said servo for controlling the application of surplus fluid flow to the servomotor in assisting relation to said twisting moments and diverting the remainder of surplus flow to drain.

7. The combination set forth in claim 1 wherein, one of said control valves comprises an oscillatable valve with spaced ports connected with opposite sides of said servo, and wherein said valve means comprises a loader valve assembly connected to said surplus flow conduit and said servo for controlling the application of surplus fluid flow to the servomotor in assisting relation to said twisting moments and diverting the remainder of surplus flow to drain, and a valve assembly inserted in the connection to the other side of said servo for retarding the rate of return flow therefrom.

8. The combination set forth in claim 1 wherein, one of said control valves comprises an oscillatable valve connected with the controlled pressure source and having two spaced ports, passage means connecting each of said ports with opposite sides of said servomotor, a pressure compensating valve assembly inserted in one of said connections, said valve assembly comprising a check valve for admitting flow of fluid from said control valve to one side of said servomotor with substantially no decrease of potential, and a constant pressure valve operable to restrict rapid flow of fluid to drain from said one side of said servo, and wherein said valve means comprises a loader valve assembly connected to said surplus flow conduit between the variable pressure control valve and the passage to the other side of said servo, said loader valve assembly including a check valve for directing the surplus fluid flow thru one passage to said other side of said servo, and a valve responsive to the flow of said surplus fluid for diverting the remainder of said surplus flow to drain.

9. In a control for adjusting the pitch of rotatable aircraft propeller blades, a hub and blades movable with respect thereto thru a range of pitch angles under the resultant of centrifugal and aerodynamic forces affecting said blades, a reversible servomotor for actuating the blades in increasing and decreasing pitch directions, a high capacity fluid pressure source, pressure control means connected with the source and with said servomotor for adjusting the potential source to regulate the pressure potential of said source in accordance with the demands of said servomotor, means including said pressure control means for diverting to a conduit any surplus of fluid flow more than is needed for actuating the servomotor, a control valve connected to the source and the servomotor for applying regulated pressure fluid to the servomotor for accomplishing an increase pitch change in the adjustment of said propeller blades, a drain passage controlled by said control valve for return of fluid from the other side of said servomotor, valve means connected with the said drain passage and said surplus flow conduit for applying at least a portion of the surplus from the adjusted pressure to said other side of said servomotor for actuating the propeller blade in a decreasing pitch direction, and valve means for restricting the drain back of fluid flow from said first mentioned side of the servomotor.

10. A control system for adjusting the pitch position of propeller blades mounted for rotation about their longitudinal axes and subject to external aerodynamic and centrifugal twisting moments which tend to rotate the blades towards a predetermined pitch position, and including a fluid pressure operated servomotor operatively connected with said blades for adjusting the pitch position thereof, comprising in combination, a high capacity fluid pressure source, a variable pressure control valve assembly operatively connected with said source and said servomotor and operable to control the pressure potential of said source in accordance with the pressure potential required by said servomotor in adjusting the pitch position of said blades, said variable pressure control valve assembly having connection with a conduit and being operable to divert any surplus flow of said source to said conduit, first control valve means operatively connected with said source and said servomotor for applying pressure fluid from said source to said servomotor so as to adjust the pitch position of said blades in opposition to the external forces, second control valve means operatively connected with said surplus flow conduit and said servomotor for applying diverted surplus flow to said servomotor so as to adjust the pitch position of said blades in assistance with said external forces, and means for actuating the first and second control valve means for automatic and manual adjustment of propeller pitch in accordance with a selected regime of propeller operation.

11. A control system for adjusting the pitch position of propeller blades mounted for rotation about their longitudinal axes and subject to external aerodynamic and centrifugal twisting moments which tend to rotate the blades towards a predetermined pitch position, and including a fluid pressure operated servomotor operatively connected with said blades for adjusting the pitch position thereof, comprising in combination, a high capacity fluid pressure source, a variable pressure control valve assembly operatively connected with said source and said servomotor and operable to control the pressure potential of said source in accordance with the pressure potential required by said servomotor in adjusting the pitch position of said blades, said variable pressure control valve assembly having connection with a conduit and being operable to divert any surplus flow of said source to said conduit, control valve means operatively connected with said source and said servomotor for applying pressure fluid from said source to said servomotor in assistance to said external forces, a loader valve assembly operatively connected to said surplus flow conduit and said servomotor for applying said diverted surplus flow to said servomotor in assistance to said external forces, and a compensating valve assembly in the connection between said control valve means and said servomotor for permitting unrestricted application of fluid pressure from said source to said servomotor in opposition to said external forces.

12. A control system for adjusting the pitch position of propeller blades mounted for rotation about their longitudinal axes and subject to external aerodynamic and centrifugal twisting moments which tend to rotate the blades towards a predetermined pitch position, and including a fluid pressure operated servomotor operatively connected with said blades for adjusting the pitch position thereof, comprising in combination, a high capacity fluid pressure source, a variable pressure control valve assembly operatively connected with said source and said servomotor and operable to control the pressure potential of said source in accordance with the pressure potential required by said servomotor in adjusting the pitch position of said blades, said variable pressure control valve assembly having connection with a conduit and being operable to divert any surplus flow of said source to said conduit, a loader valve assembly operatively connected to said surplus flow conduit and said servomotor for applying at least a portion of said diverted flow to the servomotor in assistance to said external forces, and control means operatively connected to said source and said servomotor for selectively applying pressure fluid from said source to said servomotor.

13. The combination set forth in claim 12 wherein, the control means includes a reversely movable valve connected to pressure fluid of the controlled potential and having spaced ports and passages connected with said servomotor, one of said ports and passages including a compensating valve assembly permitting flow of pressure fluid of said controlled potential without substantial diminution to the servomotor and restricting reverse flow therefrom.

14. The combination set forth in claim 12 wherein, the control means includes a reversely movable valve connected to pressure fluid of the controlled potential and having spaced ports and passages connected with said servomotor, one of said ports and passages including a connection to said loader valve assembly for controlling the effect of said diverted flow upon said servomotor.

15. The combination set forth in claim 12 wherein, the control means includes a reversely movable valve connected to pressure fluid of the controlled potential and having spaced ports and passages connected with said servomotor, one of said ports and passages including a compensating valve assembly permitting flow of said controlled potential without substantial diminution to the servomotor and restricting reverse flow therefrom, and another of said ports and passages including a connection to said loader valve assembly for controlling the effect of said diverted flow upon said servomotor.

References Cited in the file of this patent
UNITED STATES PATENTS

| 2,413,439 | Drake | Dec. 31, 1946 |
| 2,556,700 | Moore et al. | June 12, 1951 |